United States Patent [19]

Masuda

[11] Patent Number: 5,409,288
[45] Date of Patent: Apr. 25, 1995

[54] MODULE CARRIER STRUCTURE FOR VEHICLE FRONT

[75] Inventor: Toshio Masuda, Ashikaga, Japan

[73] Assignee: Fuji Jukogyo Kabushiki Kaisha, Tokyo, Japan

[21] Appl. No.: 180,311

[22] Filed: Jan. 12, 1994

[30] Foreign Application Priority Data

Jan. 25, 1993 [JP] Japan .................. 5-5141 U

[51] Int. Cl.⁶ ............................................. B62D 25/08
[52] U.S. Cl. .................... 296/194; 296/203; 296/29; 293/155; 180/68.4
[58] Field of Search ............ 296/194, 187, 185, 203, 296/29, 30; 293/121, 155; 180/68.4

[56] References Cited

U.S. PATENT DOCUMENTS

| 4,428,447 | 1/1984 | Malen | 296/194 X |
| 4,940,281 | 7/1990 | Komatsu | 296/194 |

FOREIGN PATENT DOCUMENTS

| 1530795 | 6/1969 | Germany | 296/194 |
| 63-312279 | 12/1988 | Japan. | |
| 312279 | 12/1988 | Japan. | |
| 1751028 | 7/1992 | U.S.S.R. | 296/194 |

Primary Examiner—Dennis H. Pedder
Attorney, Agent, or Firm—Beveridge, DeGrandi, Weilacher & Young

[57] ABSTRACT

A module carrier structure for the vehicle front includes an upper horizontal frame portion and a lower horizontal frame portion that constitute a radiator mounting central frame. The carrier structure further includes a middle horizontal frame portion extending in front of the central frame such that the middle horizontal frame portion simply rests on a rear beam member of a front bumper when the carrier structure is fastened to the front of the vehicle body. The carrier structure has a central vertical stay portion extending in front of the central frame, coupling the upper and middle horizontal frame portions to each other. The stay portion has at the top thereof a hood lock mounting member for mounting a hood lock thereon. Downward load of the front hood applied to the lock mounting member is transmitted to the vertical stay portion and distributed to the middle horizontal frame position. Even when a light collision occurs, the front bumper and its rear beam member are simply shifted to the rear relative to the middle horizontal frame portion, and no substantial influence occurs to the carrier structure.

7 Claims, 2 Drawing Sheets

MODULE CARRIER STRUCTURE FOR VEHICLE FRONT

BACKGROUND OF THE INVENTION

The present invention relates to a module carrier structure for the front of a vehicle.

A module carrier is disclosed in the Japanese Patent Application Laid-Open No. 63-312279. The carrier has a front panel of a vehicle, and on the front panel are mounted an engine radiator, a cooling fan and a condenser of an air conditioner. The front panel with the above components mounted thereon is secured to the front of the vehicle body by bolts or the like in the process of assembly of the vehicle.

A center upper portion of the vehicle front should have a hood lock mounting part member mounting a lock for the front hood of the vehicle. The known module carrier is integrally formed as a suction fan type and is open at the front thereof so as to allow installation and removal of the radiator, the condenser and so on into and out of the vehicle engine compartment only through the front thereof. For this reason, it is difficult to provide the mounting member on the upper central portion of the carrier structure. If the mounting member were provided on the upper central portion of the carrier structure, a complicated construction would have to be provided for reinforcement which enables withstanding the downward load from the front hood at the time of closure thereof. For that reason, two hood lock mounting members must usually be provided on the right and left upper portions of the carrier structure to mount a pair of locks or laches for the hood. As a result, the number of the components of the vehicle increases, and it is necessary to provide a synchronizing mechanism for unlocking the right and the left locks at the same time. This causes a problem in that the vehicle is made more complicated in constitution and higher in cost.

SUMMARY OF THE INVENTION

The present invention is made in order to solve the problem mentioned above. It is an object of the present invention to provide a module carrier structure for the vehicle front in which the load of the front hood of the vehicle is supported reliably and deformation of the front bumper as a result of a light collision does not influence the module carrier structure.

According to the present invention, there is provided a module carrier structure for a vehicle front, having a front bumper with a rear bumper beam connected to said vehicle front, the carrier structure being installed in an engine compartment for mounting a radiator and a condenser of an air conditioner, the carrier structure comprising a radiator mounting central frame for mounting said radiator and condenser therein, an upper horizontal frame portion provided on said central frame, a lower horizontal frame portion provided under said central frame in parallel with said upper horizontal frame portion for mounting said radiator and condenser thereon, a middle horizontal frame portion disposed between the upper and lower horizontal frame portions, the middle frame portion resting on the rear bumper beam so as to allow shifting movement of the bumper beam relative to the middle frame portion, and a central vertical stay portion coupling the upper and middle horizontal frames and having thereon a hood lock mounting means for mounting a lock for a front hood of the vehicle.

When the hood of the vehicle is closed and locked on the module carrier structure, the downward load from the front hood is distributed to the middle horizontal frame portion thereof through the hood lock mounting means and the central stay portion so that the load is securely borne by the rear beam member of the front bumper of the vehicle. For that reason, the carrier structure does not need to be provided with two hood locks, and can be made simpler in constitution and lower in weight and cost. Since the middle horizontal frame portion of the carrier structure is not fixedly coupled to the rear beam member of the front bumper but simply placed to the beam member, it is allowed to shift rearward under the middle horizontal frame portion so that even when the front bumper is deformed due to a light collision against a barrier, the beam member is slightly displaced rearward and the carrier structure is not affected. For that reason, a radiator and a condenser which are fastened to the carrier structure are not damaged at the time of the deformation of the bumper. Besides, the height of the carrier structure can be decreased to lower the front end of the hood. Furthermore, the carrier structure is a module structure so that components such as the radiator and the condenser can be collectively and integrally fastened to the carrier frame and component maintenance and replacement are facilitated.

DESCRIPTION OF A PREFERRED EMBODIMENT

A preferred embodiment of the present invention will become understood from the following detailed description thereof referring to the accompanying drawings.

Figure 1:
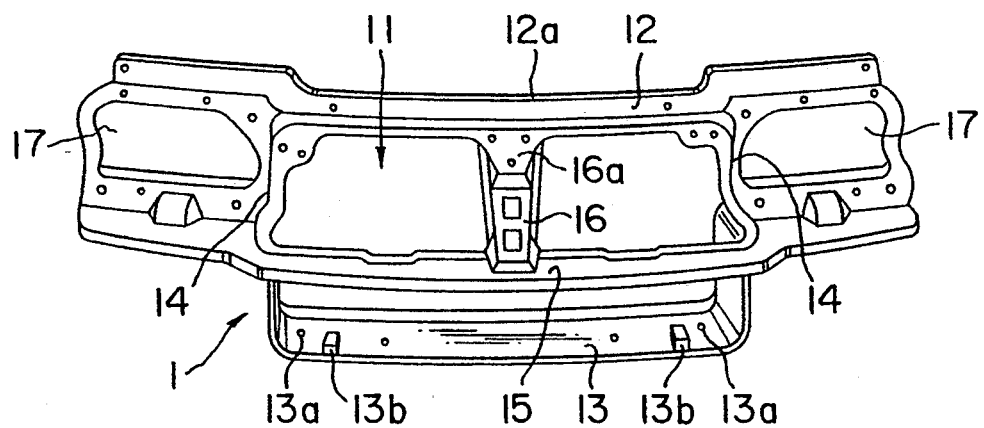
FIG. 1 is a perspective view, as viewed from the front and obliquely above, of a module carrier structure for the front of a vehicle, according to the present invention.
Figure 2:
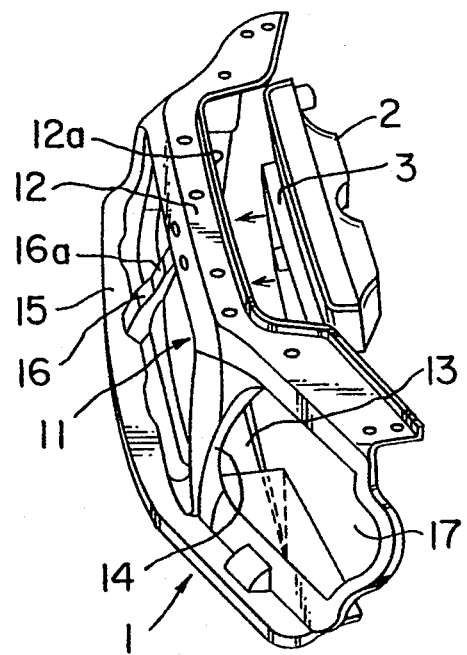
FIG. 2 is a perspective view, as viewed from a side and obliquely above, of the carrier structure of FIG. 1.

FIGS. 1 and 2 show a module carrier structure 1 for the front of a vehicle according to the present invention. The carrier structure 1 comprises an upper horizontal frame portion 12, a lower horizontal frame portion 13, right and left vertical frame portions 14, a middle horizontal frame portion 15, a central vertical stay portion 16, and right and left headlight mounting portions 17. The portions 12, 13, 14, 15, 16 and 17 are made integral as a whole. The carrier structure 1 has a central, radiator mounting frame 11 made up of the portions 12, 13 and 14. The middle horizontal frame portion 15 extends in front of the space between the upper horizontal frame portion 12 and the lower horizontal frame portion 13. Central parts of the upper and lower horizontal frame portions 12 and 15 are coupled to each other by the stay portion 16.

The upper frame portion 12 has a rear recess or cutout 12a extending along a prescribed length of the portion 12, as shown in FIG. 2. When an engine radiator 2 of the vehicle is fastened to radiator mounting parts 13a of the lower horizontal frame portion 13, an upper portion of the radiator 2 is adapted to be fitted in the cutout 12a.

The lower horizontal frame portion 13 also has right and left condenser mounting parts 13b located in front of the radiator mounting parts 13a. The radiator mounting parts 13b are provided at the front of the portions 13a in order to fasten a refrigerant condenser 3 of an air conditioner of the vehicle to the portions 13b.

Figure 3:
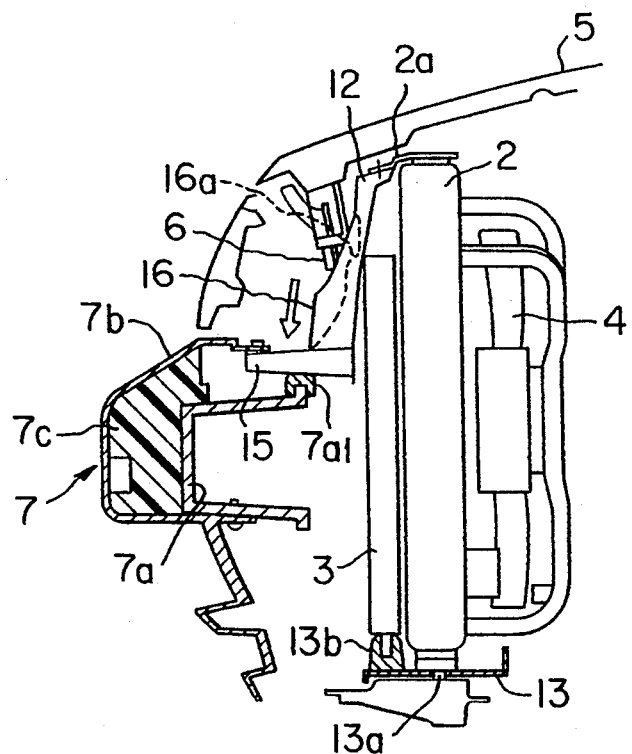
FIG. 3 is a side view of the carrier structure in a state where a radiator is mounted thereon and the carrier structure is fastened to the vehicle.

The radiator 2 and the condenser 3 are inserted into the radiator mounting central frame 11 from behind the carrier structure 1, as shown in FIG. 2. Thereafter, the condenser 3 is fastened to the condenser mounting parts 13b of the lower horizontal frame portion 13; the radiator 2 is fastened to the radiator mounting parts 13a; and a cooling fan 4 is fastened to the rear of the radiator 2, as shown in FIG. 3. As a result, a suction fan type structure is formed. The upper portion of the radiator 2 is fitted in the cutout 12a of the upper horizontal frame portion 12 and fastened thereto by fastening members 2a which are typically bolts and nuts. The peripheral portions of the cooling fan 4 are coupled by bolts to the principal elements of the radiator mounting central frame 11 made of the upper and lower horizontal portion 12 and 13, and the right and left vertical portions 14. The central stay 16 has at the top thereof a hood lock mounting member 16a to which a hood lock 6 for locking a front hood 5 of the vehicle is mounted.

After the radiator 2, the condenser 3 and the cooling fan 4 are fastened to the carrier structure 1 as described above and headlights are attached to the headlight mounting portions 17, the carrier structure is secured to the front portion of the vehicle body by bolts or the like so that, as shown in FIG. 3, the bottom of the middle horizontal frame portion 15 of the carrier structure rests via a buffer material 7a1 on a rear beam member 7a of a front bumper 7, and an upper edge of a face member 7b of the bumper 7 is secured to the upper surface of the forward edge of the middle horizontal frame portion 15. The buffer material 7a1 may be in the form of a strip extending along the length of the beam member 7a. The hood lock 6 is fastened to the hood lock mounting part 16a of the central stay portion 16 so that the hood 5 can be locked when it is closed. When the hood 5 is closed, the downward load from the hood is transmitted through the stay portion 16 and is distributed to the middle horizontal frame portion 15. The distributed load is then carried by the rear beam member 7a of the bumper 7 through the buffer material 7a1.

Since the downward load from the closed and locked hood 5 is distributed to the middle horizontal frame portion 15 supported by the rear beam member 7a of the bumper 7, the load is reliably carried by the modular carrier structure 1 at the upper half of the structure.

Figure 4:
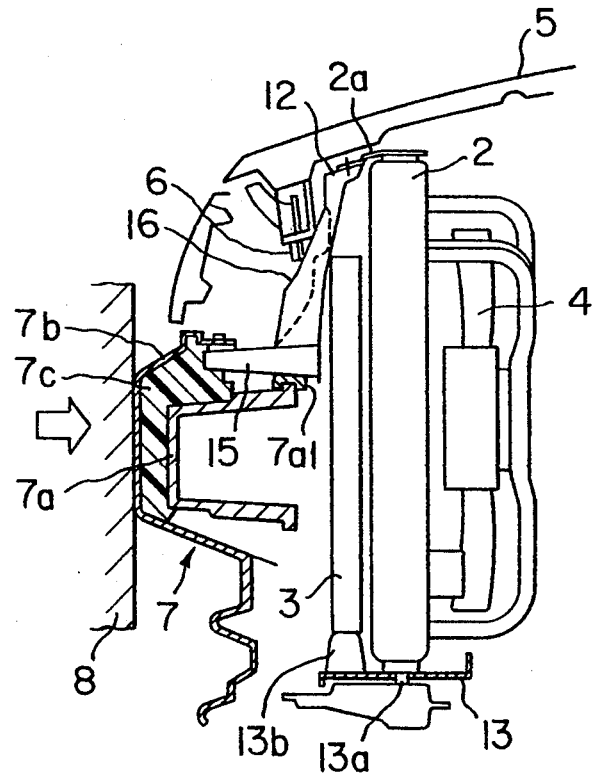
FIG. 4 is a side view of the carrier structure in a state where a front bumper of the vehicle is deformed due to a light collision.

It is to be noted that the middle horizontal frame portion 15 of the module carrier structure 1 is not securely coupled to the rear beam member 7a of the front bumper 7 but simply placed on the member 7a. Therefore, the carrier structure 1 is hardly affected by a deformation of the bumper 7 which is caused when it lightly collides against a barrier 8 as shown in FIG. 4. At the time of a light collision, a shock absorber material 7c of the bumper 7, which is an elastic material between the rear beam member 7a and the face member 7b, is compressively deformed and the rear beam member is also deformed rearward. However, since the middle horizontal frame portion 15 of the carrier structure 1 is simply placed on the buffer material 7a1 on the beam member 7a, the member 7a is freely moved rearward relative to and under the frame portion 15 at the light collision so that the carrier structure 1 is hardly affected by the deformation of the bumper 7. Since the face member 7b of the bumper is made of a thin sheet of a synthetic resin and is not a rigid body, the face member 7b itself is elastically deformed at the time of the collision and hardly affects the middle horizontal frame portion 15 at that time although the upper edge of the face member is coupled to the top of the frame portion 15.

Since the top of the radiator 2 fastened to the carrier structure 1 is not covered with the upper horizontal frame portion 12, the height of the carrier structure can be reduced to allow the upper portion of the radiator 2 to protrude up from the radiator mounting central frame 11 of the carrier structure and to allow the front end portion of the hood 5 of the vehicle to be low. This is useful to enlarge the degree of freedom of the vehicle design. Furthermore, according to the present invention, the radiator 2 can be installed vertically into and taken vertically out of the vehicle body because of the constitution of the carrier structure once the hood 5 is opened. For this reason, inspection, maintenance and replacement of components of the radiator and other inside components can be made easily without removing the front bumper 7, the front grille and so on. As a result, servicing and maintenance can be performed on the vehicle in practical use in and on the carrier structure in spite of being a module type structure.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A module carrier structure for a vehicle front, having a front bumper with a rear bumper beam connected to said vehicle front, said carrier structure being installed in an engine compartment for mounting a radiator and a condenser of an air conditioner, said carrier structure comprising:

a radiator mounting central frame for mounting said radiator and condenser therein:

an upper horizontal frame portion provided on said central frame;

a lower horizontal frame portion provided under said central frame in parallel with said upper horizontal frame portion for mounting said radiator and condenser thereon;

a middle horizontal frame portion disposed between the upper and lower horizontal frame portions, said middle frame portion resting on said rear bumper beam so as to allow shifting movement of the bumper beam relative to the middle frame portion; and a central vertical stay portion coupling said upper and middle horizontal frames and having thereon a hood lock mounting means for mounting a lock for a front hood of the vehicle.

2. The module carrier structure according to claim 1, further comprising:

fastening means for fastening an upper portion of the radiator to said upper horizontal frame portion.

3. The module carrier structure according to claim 1, further comprising:

cutout means formed at a rear of the upper horizontal frame portion for fitting an upper portion of the radiator therein.

4. The module carrier structure according to claim 1, wherein:

said middle horizontal frame portion is disposed in front of the upper and lower horizontal frame portions.

5. The module carrier structure according to claim 1, wherein:

said vertical stay portion carries the hood lock mounting means at a top thereof.

6. The module carrier structure according to claim 1, wherein:

said front bumper has a bumper face sheet that is fastened to the middle horizontal frame portion.

7. The module carrier structure according to claim 1, further comprising:

headlight mounting portions provided at both sides of the radiator mounting central frame.

* * * * *